(12) United States Patent
Gomez Barbero (10) Patent No.: US 11,984,707 B2
(45) Date of Patent: May 14, 2024

(54) BUSBAR ADAPTER WITH AUTOMATIC SWITCH

(71) Applicant: GORLAN TEAM, S. L. U., Amorebieta (ES)

(72) Inventor: Jose Julio Gomez Barbero, Amorebieta (ES)

(73) Assignee: GORLAN TEAM, S.L.U., Amorebieta (ES)

( * ) Notice: Subject to any disclaimer, the term of this patent is extended or adjusted under 35 U.S.C. 154(b) by 189 days.

(21) Appl. No.: 17/437,041

(22) PCT Filed: Mar. 9, 2020

(86) PCT No.: PCT/ES2020/070166
§ 371 (c)(1),
(2) Date: Sep. 7, 2021

(87) PCT Pub. No.: WO2020/183045
PCT Pub. Date: Sep. 17, 2020

(65) Prior Publication Data
US 2022/0181855 A1      Jun. 9, 2022

(30) Foreign Application Priority Data

Mar. 8, 2019   (EP) ..................................... 19382174

(51) Int. Cl.
*H02B 1/21*     (2006.01)
*H02B 1/20*     (2006.01)
(Continued)

(52) U.S. Cl.
CPC .................. *H02B 1/20* (2013.01); *H02H 3/08* (2013.01); *H02H 7/22* (2013.01)

(58) Field of Classification Search
CPC ... H02B 1/20; H02B 1/21; H02H 3/08; H02H 7/22; H03H 3/085
See application file for complete search history.

(56) References Cited

U.S. PATENT DOCUMENTS 11,139,747 B2* 10/2021 Steinberger ........... H02M 7/003
2007/0109704 A1  5/2007 Apfelbacher et al.
2015/0301111 A1* 10/2015 Bruchmann ............. H01H 9/10
361/679.01

FOREIGN PATENT DOCUMENTS

| CN | 202405623 U | 8/2012 |
|----|-------------|--------|
| FR | 2967832 | 5/2012 |
| WO | 2016/042290 | 3/2016 |

OTHER PUBLICATIONS

Extended European Search Report dated Sep. 10, 2019 issued by the European Patent Office for related application EP 19382174, includes European Search Report (2 pgs.) and European Search Opinion (3 pgs.), in English.

(Continued)

*Primary Examiner* — Adolf D Berhane
(74) *Attorney, Agent, or Firm* — Hassan Abbas Shakir; Shakir Law PLLC (57) ABSTRACT

A device has three single-pole modules and a chassis that can be connected to a busbar distribution system. The chassis has three input connections and three output connections, wherein each single-pole module has single-pole means for protecting against short-circuits and overloads and single-pole means for interrupting and establishing current, and wherein the input connections and output connections and the single-pole modules form three independent single-phase circuits.

16 Claims, 11 Drawing Sheets

(51) Int. Cl.
*H02H 3/08* (2006.01)
*H02H 7/22* (2006.01)

(56) References Cited

OTHER PUBLICATIONS

International Search Report for patent application PCT/ES2020/070166 issued Jun. 15, 2020 by the European Patent Office, official translation provided.
Written Opinion of the International Searching Authority for patent application PCT/ES2020/070166 issued by the European Patent Office and uploaded to WIPO Patentscope Sep. 29, 2020, official translation provided.
Communication by the European Patent Office in related EPO application 19382174.1-1201 dated May 27, 2022, in English, 11 pgs.
Office Action in related Chinese Patent Application No. 2020800340755 issued by the National Intellectual Property Administration, People's Republic of China and having issue date of Jan. 31, 2024, 13 pgs. including 3 pg. translation.

\* cited by examiner

BUSBAR ADAPTER WITH AUTOMATIC SWITCH

OBJECT OF THE INVENTION

The present invention belongs to the field of the low-voltage boards for the distribution of low-voltage electrical power. In particular, it relates to low-voltage boards in which current is distributed by means of several busbars parallel to one another, in a horizontal arrangement, one for each phase, and more particularly to a device for the output of these boards.

BACKGROUND OF THE INVENTION

Vertical fuse blocks for busbar systems with 185 mm spacing (vertically measured center-to-center spacing of the bars) are the devices that are most used by electric utilities for low-voltage (LV) distribution. This system allows a very compact design of LV distribution boards. A general description of this type of design considers an observer who is standing facing the low-voltage distribution board. An x-axis running parallel to the ground, from left to right in reference to the observer, and a y-axis running parallel to the ground and perpendicular to the x-axis, and defining the depth of the system, are thereby defined. Moreover, a z-axis is defined perpendicular to the other two and defines the height of the assembly. The most common system is one in which the busbars run parallel to the ground along the x-axis, with a 185 mm center-to-center spacing between the busbars.

In these busbar systems today, current is distributed by means of three-pole bases with a "vertical" design. These bases have a design which, broadly speaking, would comprise a parallelepiped in which four of its parallel edges are much longer than the other eight, so it has the appearance of an "elongated" parallelepiped, with its longest edges parallel to the z-axis.

The main objective of these busbar systems is to distribute power. That is, current enters a single circuit and is split into a number of branches for distribution. This splitting into "branches" is done by means of the fuse blocks.

The fuse blocks have input contacts in the rear part positioned in a vertical line with the same spacing as the busbars, such that they are aligned with same and allow a comfortable connection. The output contacts are located in the lower part of the base, such that the output cables of the fuse blocks exit from below in an orderly manner. This type of design allows the placement of some fuse blocks parallel to others, depending on the busbar, for an orderly distribution of the conductors and making the best use of the space.

The fuse blocks are stacked parallel to one another along the busbars. These systems are referred to as a "distribution busbar".

The standardization of fuse block dimensions has allowed, over time, the development of a number of cable connectors, safety tools, even operating procedures, which have been improved over the years. Fuse block output connections are currently among the most optimized in terms of dimensions and accessibility. Furthermore, with the emergence of "Smart grids" on the market, different monitoring devices which are installed in fuse block outlets have been developed.

Conventional switch-disconnectors and automatic switches on the market are not compatible with being installed in busbar systems, so the use thereof is not standardized in electric utilities. Both the input connections and the output connections are arranged horizontally and require a transition busbar to go from a vertical to horizontal phase arrangement.

This means that distribution systems with outputs protected by automatic switches are of a much larger size than those made with fuse blocks. Transition busbars are required to go from the horizontal position of the switch connections to the vertical position of the busbar connections. These transition busbars make the solution more expensive and are not particularly efficient as a solution with fuse blocks that makes better use of the available space. Furthermore, with the fuse block system having a vertical design the number of possible outputs in the same space increases.

Furthermore, one of the biggest drawbacks of automatic switches is that their dimensions are not regulated under any standard, such that each manufacturer has its own. This makes them utterly incompatible with the electric utility market in which the products of different manufacturers must be 100% compatible and interchangeable. This allows electric utilities to purchase equipment through competitive bidding, such that the purchase is split up among different manufacturers and any equipment can be installed in any board. This increases their purchasing flexibility and improves purchase prices.

Internationally, there is a set of distribution boards which adapts to the dimensions considered in the fuse block standard. The most important dimensions, and for which busbar systems are prepared, comprise a maximum width of 100 mm for devices and a 185 mm spacing between input connections.

To solve the problem of adapting the horizontal position of the connections for converting them into vertically positioned connections, which are compatible with distribution busbars of automatic switches, adapters for installing automatic switches in horizontal busbars have recently been launched on the market. These adapters transform a vertical connection into a horizontal connection in which can the automatic switch can be mounted.

With these adapters multi-phase switches with a conventional design can be installed in horizontal busbars. However, they continue to have the problem of requiring a large amount of space, and furthermore, as there is no standard that normalizes the dimensions thereof, each manufacturer has its own dimensions, so interchangeability is still not possible.

During their manufacture, busbar distribution systems and/or distribution boards may or may not be accessible from the back part of the busbar, depending on the board design. Normally, however, when the distribution board is installed in a transformer substation, it can only be accessed from the front. This is why it is important for devices to be able to be connected from the front.

In some busbar distribution system applications, the output cables do not exit from below, but rather come out (or exit) (from) above. This depends on if the cables are conducted through an underground or in the roof of the installation cable ducts. In those cases, the output terminals must be located in the upper part instead of the lower part in a reversible configuration.

Conventional switch-disconnectors and automatic switches that can be found on the market present the feature that current is interrupted in all its phases at once (all-pole current disconnect) i.e.; they do not allow the separate current disconnect for each of the phases.

Therefore, they consist of a mechanism which operates all the phases at the same time. In the case of automatic switches, the mechanism trips all the phases in the event that a short-circuit or overload is detected in one of them. One of the advantages of fuse blocks (or fuse switches) with respect to switch-disconnectors is that they allow single-pole disconnection, i.e., they allow interrupting the current of each of the phases separately.

A common use for these switches is in industrial applications in which the disconnection of all the phases is accepted and there is no need to disconnect the phases individually. It is fundamental to maintain power supply to customers on the electric utility market. Most customers consume power of only one of the phases, i.e., if the electric utility needs to cut off power due to a malfunction or maintenance work, it will search for devices that allow it to disconnect only the affected phase while the other phases continue in service, and customers that are connected to those phases are not affected by the disconnection and their power supply is maintained. For that, fuse blocks are the device most used by electric utilities, because they allow interrupting the current of each of the phases separately.

Alternatively, and for special applications, it may be desirable, in the event of a fault in one of the phases, for the device to trip the phase with the fault, but also for the rest of the phases to be tripped as well. This could be in cases where the device is protecting engines or maintenance work is being performed on that that line, and for increased personal safety, the supply is to be eliminated in the three phases.

It is known in the field of automatic switches that even though the device is tripped automatically, manual switching can also be performed locally. The switches are equipped with a control and a mechanism which can interrupt or establish current upon manual action by a user. In some cases, remote switching is required for interrupting or establishing current.

The most common incidences in distribution grids are related to overloads and minor faults of no major significance. That is, the occurrence of short-circuits is not very common, but due to the severity of the consequences thereof, distribution systems need reliable protection against this phenomenon.

As is known, a fuse is an element offering many advantages as regards protection against short-circuits. The fast response of fuses with respect to automatic switches is well documented in the state of the art. The short-circuit levels which can cause the fuse to operate are much higher than those offered by an automatic switch. For an automatic switch to be able to operate against a short-circuit of such a high value (similar to a fuse), it would have to be just as big in size, making it incompatible with its use as an output device in the design of distribution boards. The fuse consists of a very simple mechanism and it does so in a very small space compared to the complexity of the mechanism of the automatic switch. An automatic switch with a high breaking capacity against short-circuits is therefore incompatible with the compact design required by electric utilities.

As mentioned in the preceding paragraphs, the most common type of incidence is not short-circuiting, but rather insignificant faults, i.e., the power returns to its natural state in a matter of seconds and normal operation is restored. That is, current peaks cause the fuse to operate but are not grounds for any real danger. In these cases, fuse protection has a weak spot, because in these cases the fuses operates. After a fuse operation, someone has to go to where it is located to replace it with a new one. This is expensive for electric utilities. In some cases, for specific applications it is difficult, especially when there is no justified reason to do so. In these cases, it would be very advantageous to be able to restore current remotely without having to physically go there. Fuse blocks are devices which interrupt/establish current by manual operation of the mobile contact. The mobile contact is usually the fuse itself. This means that it is impossible to operate it automatically, let alone remotely.

In this sense, switches have the advantage that they can be operated remotely if they have the actuating drives required for this switching and current can thereby be restored from a control center.

It has been indicated that one of the advantages of the switches is that the current can be restored remotely. That is, if the switch is tripped and interrupts the current, it can be restored remotely. That is an advantage where the power has been cut off due to an overload or "insignificant" fault, which is the most common case. It would also be necessary to consider what would happen if the power is cut off because there was a short-circuit or if the reason for the short-circuit is a person who has suffered an accident. In these cases, if power is restored without having knowledge of the reason for which the supply was cut off, the problem could be made worse.

Switches have a limited number of times they are tripped by short-circuits they may sustain and they suffer with each short-circuit, gradually deteriorating and shortening the service life of the product. Devices with a long service life (20 years or more) and which have minimal maintenance needs are required on the electric utility market, and this means that automatic switches are not accepted on this market.

Automatic switches are relatively expensive equipment. Furthermore, given their philosophy, depending on the working conditions they have been exposed to over their lifetime, it may be necessary to replace them after a while. In low-voltage distribution boards, the loads the phases sustain are not always the same. That is, the working conditions of the phases may be different and there may be deteriorated phases in one piece of equipment while in the rest they are fine.

In recent years there has been a growing need to manage energy. The tendency of electrical devices in distribution systems to include current sensors is entirely in place. Furthermore, the device may include voltage taps at different points to obtain data about the voltage level of the different parts of the device. This data provided by the current and voltage sensors will be used to monitor the operation of the device by means of additional electronics.

The common way to check if a fuse is operated is to check the drop in voltage in posts thereof. For this reason, a protection and switching device that can be used as an output device of low-voltage boards to overcome the deficiencies of vertical fuse blocks and switches, in a single device, is needed. That is: it can be installed in distribution busbars, it protects against short-circuits, it protects against overloads, it allows single-pole disconnection, interruption of current, protection against overloads, protection against short-circuits, it can be operated locally and remotely, and it offers mechanical and structural improvements that facilitate the installation thereof and allows saving space. Therefore, the present invention is related, among others, to meeting these demands.

DESCRIPTION OF THE INVENTION

The present invention relates to an automatic device which is a busbar adapter for the protection, control and interruption and establishment of current which includes single-pole means for protecting against an overload and short-circuits for each of the phases of a three-pole system.

Additionally, the device may comprise manual and/or remote actuating drives for interrupting and establishing current for each of the poles.

A device is proposed which complies with the dimensions of the most common busbar systems on the market (for busbars with 185 mm spacing), such that it is compatible with most terminals, tools, and devices on the market developed for fuse blocks. The device according to the present invention allows complying with the dimensions of already known busbars, such that it is completely compatible with an existing set of distribution boards, thereby simplifying its inclusion on the market. The design of the present device includes phase conductors carrying current from the line connection to the lower part of the device, as shown in FIG. 1B, where each conductor is perfectly isolated from the remaining conductors by mechanical means, such as walls and conduits, for example.

The device according to the present invention comprises the input connections adapted for being connected to a horizontal distribution busbar system of a three-phase system. These input connection points can be located in the rear part of the device as shown in FIG. 1B and can be arranged vertically. In other examples, the connection points can be located slightly displaced with respect to others.

In a preferred embodiment, the device according to the present invention allows installation in the busbar system having access only from the front. In a first embodiment, the case or casing of the device comprises openings which allow access of a wrench from the front for tightening the input connections.

In a second embodiment, the device allows some of the front protections that are part of the casing to be removed to leave the access of the tool to the area with the input connections free. Once said connections are made, this embodiment allows putting the front protections back in place. Therefore, the device comprises two separable parts, a rear part for the connection of the device to the distribution busbar and a front part.

The device according to the present invention can rotate 180° such that once the device is rotated, the input connections can be connected at the same points, while the output connections go from being in the lower part to being in the upper part. In a preferred embodiment, the device can be rotated 180°, leaving its output connections in the upper part. In another preferred embodiment, to carry out this rotation the front part of the device can be removed, such that the rear part is rotated, and then the front part is installed again in the same position. Maintaining the position of the front part allows maintaining the ergonomics of the controls.

Therefore, an automatic switch which can trip each phase independently and while the other phases continue working is proposed. That is, in the event of an overload or short-circuit of one phase, only that phase is tripped and the others continue with the normal supply.

Tripping can be done automatically and with no external actuation. In a preferred embodiment, the device comprises means so that, optionally, in the event of the fault of one of the phases, a signal is sent to the other phases so that they also interrupt the current.

In a preferred embodiment, the device comprises a phase control or mechanism which can be operated manually and locally for interrupting or establishing the current. The device comprises a digital signal input which allows remote activation and allows its operation. In another preferred embodiment, the device has a trip coil which, once activated by an external signal, trips the mechanism for interrupting/establishing current. Therefore, the device can be operated remotely both for interrupting and for establishing current.

In a preferred embodiment, the device incorporates a fuse in each of the phases of the device. Inserting a fuse in the circuit in series with the single-pole means for protection allows increasing the short-circuit levels the device will withstand, as well as prolong the service life thereof. In the event that the protection against short-circuits is primarily the job of the fuse, the operator may go to the site to perform a more thorough analysis of the situation before restoring current by means of changing a fuse. This, which may be a drawback a priori, becomes a safety guarantee. The current being interrupted by short-circuit happens in very exceptional and highly unlikely cases. That is, only in the most exceptional cases will the user or technician have to go anywhere, but the reason for going is justified.

The device comprises means necessary for, in the event of said device being tripped, being able to identify if the disconnection was due to a short-circuit or due to an overload. This will allow deciding if the current can be restored remotely or if a more in-depth analysis of the situation is needed. Therefore, the device will have current and/or voltage sensors which allow monitoring the value thereof. This information is extremely valuable for monitoring power and having control thereof, but it will also allow, in the event of the switch being tripped, analyzing the current and/or voltage values prior to said tripping and discerning if the tripping was caused by a short-circuit or by an overload.

When a fuse is incorporated for protection against short-circuits, the task of the automatic switch for protection against overloads is limited. This task will not deteriorate the equipment over its lifetime, while the task of protecting against short-circuits can be carried out by the fuse, and the initial automatic switch is thereby "freed" of this critical aspect. Therefore, as the switch does not have to be tripped in the event of short-circuits, the service life of the automatic switch is prolonged and the need for maintenance is reduced, and the need to replace the equipment is eliminated, making it more compatible with the philosophy of the equipment for the electric utility.

Figure 4A:
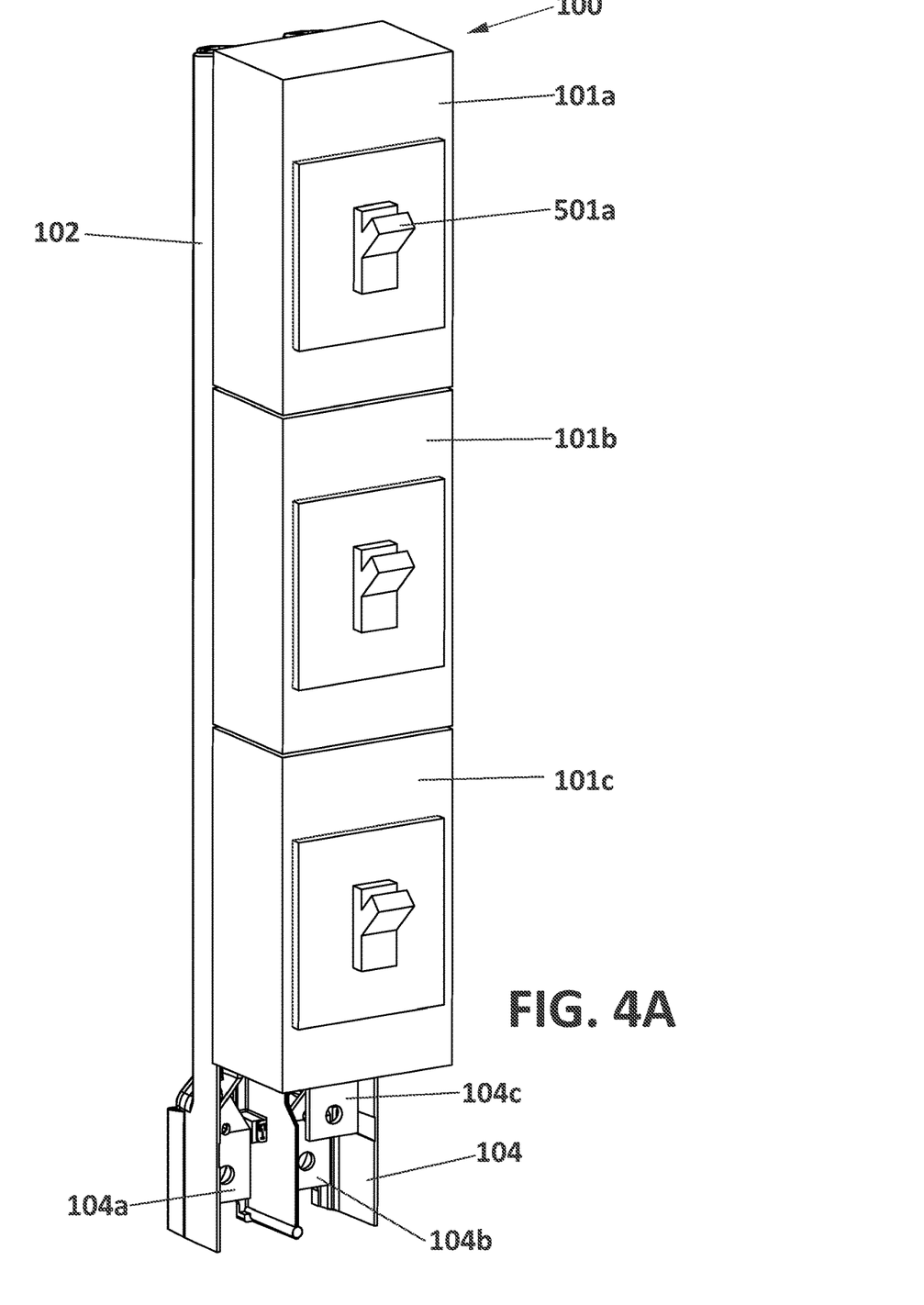
FIGS. 4A, 4B, and 4C show the modular three-phase version of the device, formed by three separable one-pole modules according to the present invention.
Figure 4B:
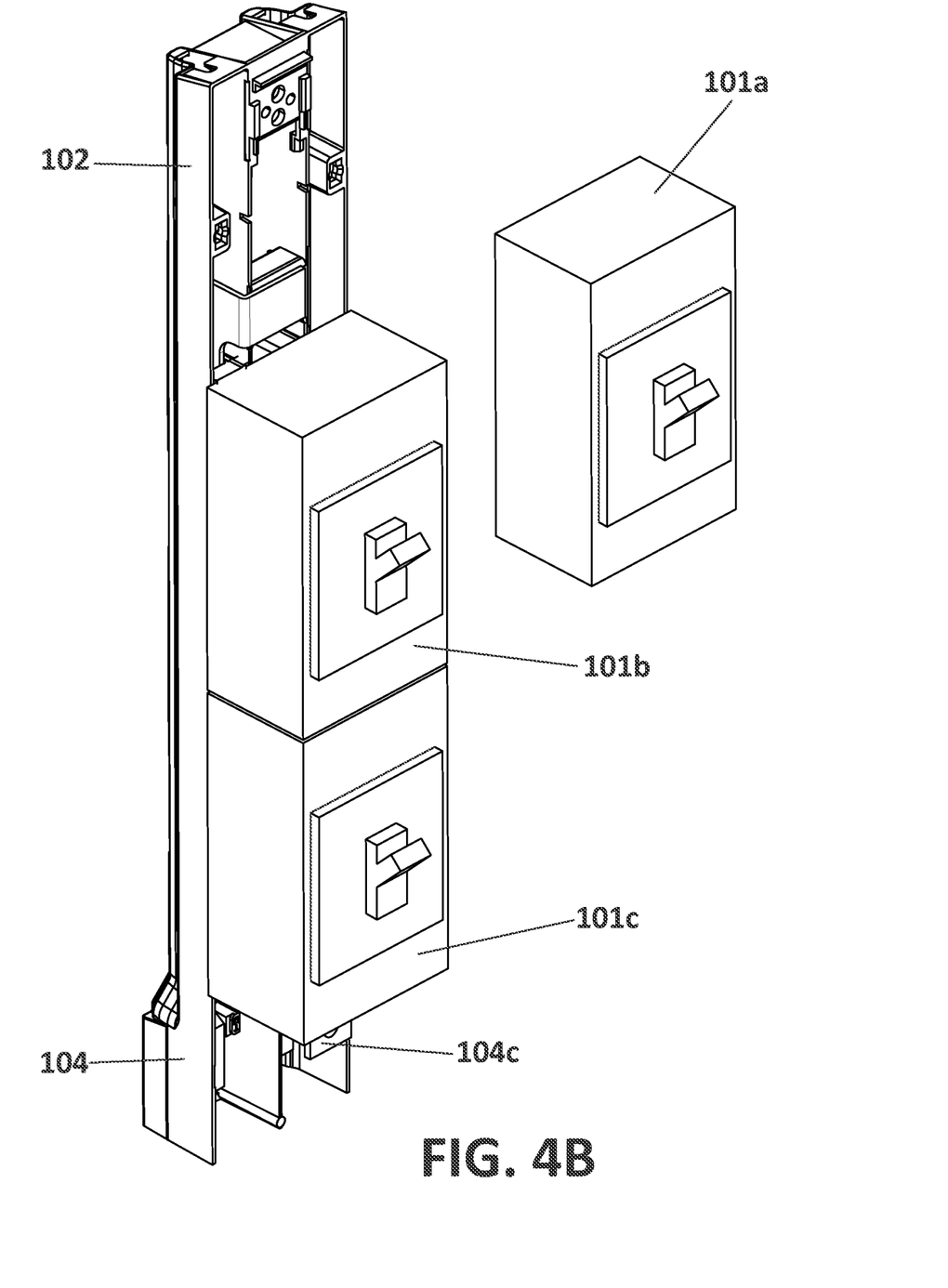
Figure 4C:
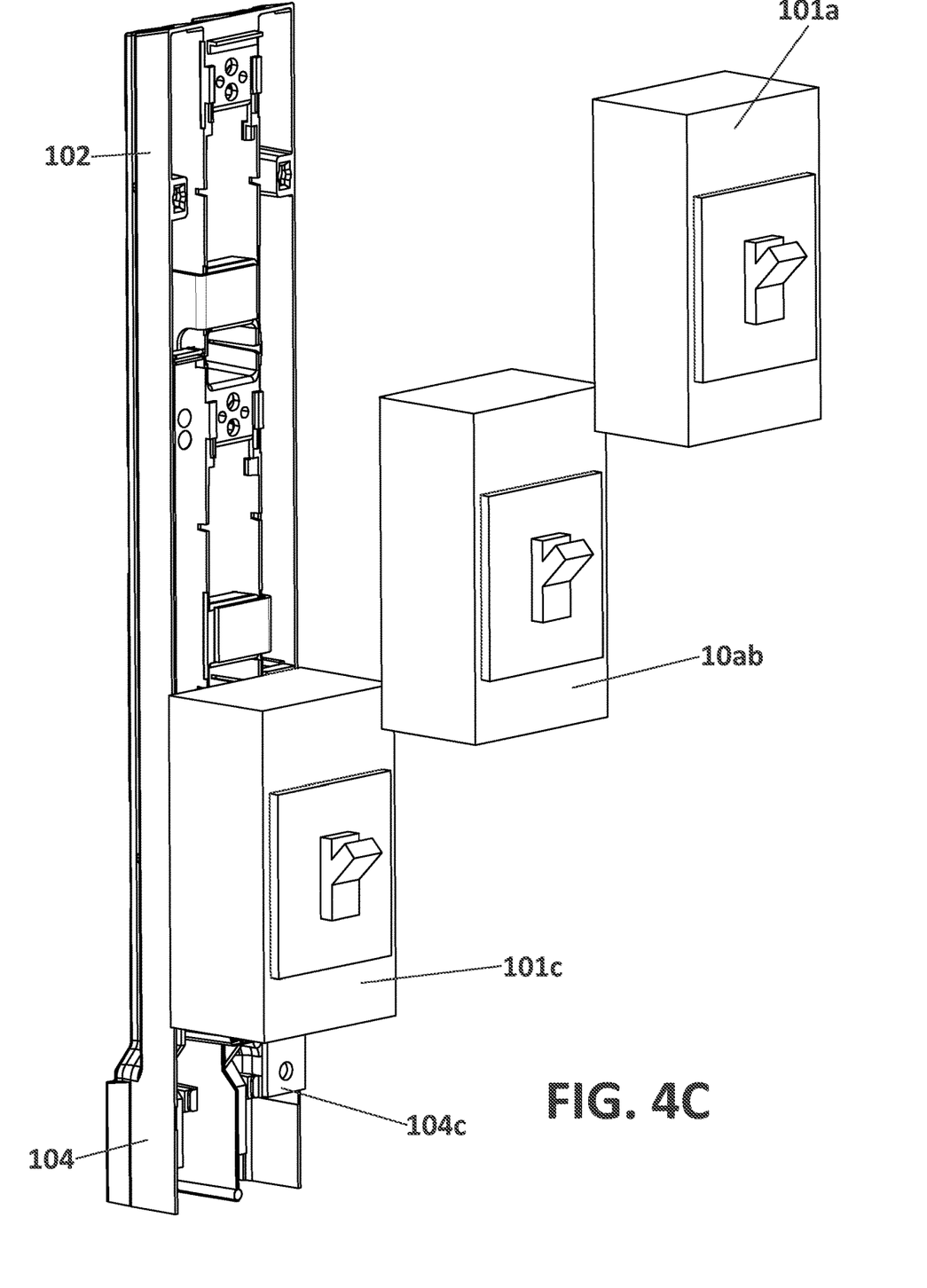

In a preferred embodiment, the device comprises a modular design formed by single-pole modules, as can be observed in FIG. 4. Therefore, in the event that the switch has to be replaced due to deterioration thereof, the assembly is formed by one-pole elements which allow replacing the pole that is damaged and not the entire assembly.

The device is compatible with measurement modules designed for fuse blocks, which include current sensors and can be placed in the output terminals.

The device comprises openings through which the tip of a tester or multimeter can be introduced to check the voltage drop in posts of each fuse and to check whether or not the fuse is blown. This check is done in situ by a user.

The device may comprise an indicator which will light up when the fuse is operated. This indicator is powered by the voltage in posts of the fuse, such that when the fuse is intact, there is no voltage drop and when the fuse has been blown, there is a voltage drop causing the activation thereof.

To complement the current and/or voltage sensors, the equipment will be equipped with electronics which, based on the current and/or voltage data provided by the sensors, allows knowing the state of the fuses, the current value, the voltage value, the frequency, the active-reactive power, etc.

Once the device has been tripped, the electronics will analyze the data from moments prior to the trip and will be able to know if it was tripped due to short-circuit or overload. This information is fundamental for deciding whether to carry out a remote reclosing or if another protocol, such as going to the location itself.

In another embodiment, by means of suitable software the electronics can decide if the conditions required for an automatic reclosing exist.

The device allows replacing the operated fuse by means removing the covers protecting it, such that once they are removed, the fuse can be accessed so that it can be comfortably removed and a new one can be inserted to replace it. This replacement of the fuse in each of the phases can be done regardless of the other phases. As a safety measure, the fuse may only be accessed when there is no circulating current, for which purpose front parts will be blocked by stops in the closed switch situation, such that they cannot be removed to access the fuse until there is a safe open switch situation.

DESCRIPTION OF THE DRAWINGS

To complement the description that is being made and for the purpose of helping to better understand the features of the invention according to a preferred practical embodiment thereof, a set of drawings is attached as an integral part of said description in which the following has been depicted with an illustrative and non-limiting character.

PREFERRED EMBODIMENT OF THE INVENTION

Figure 1A:
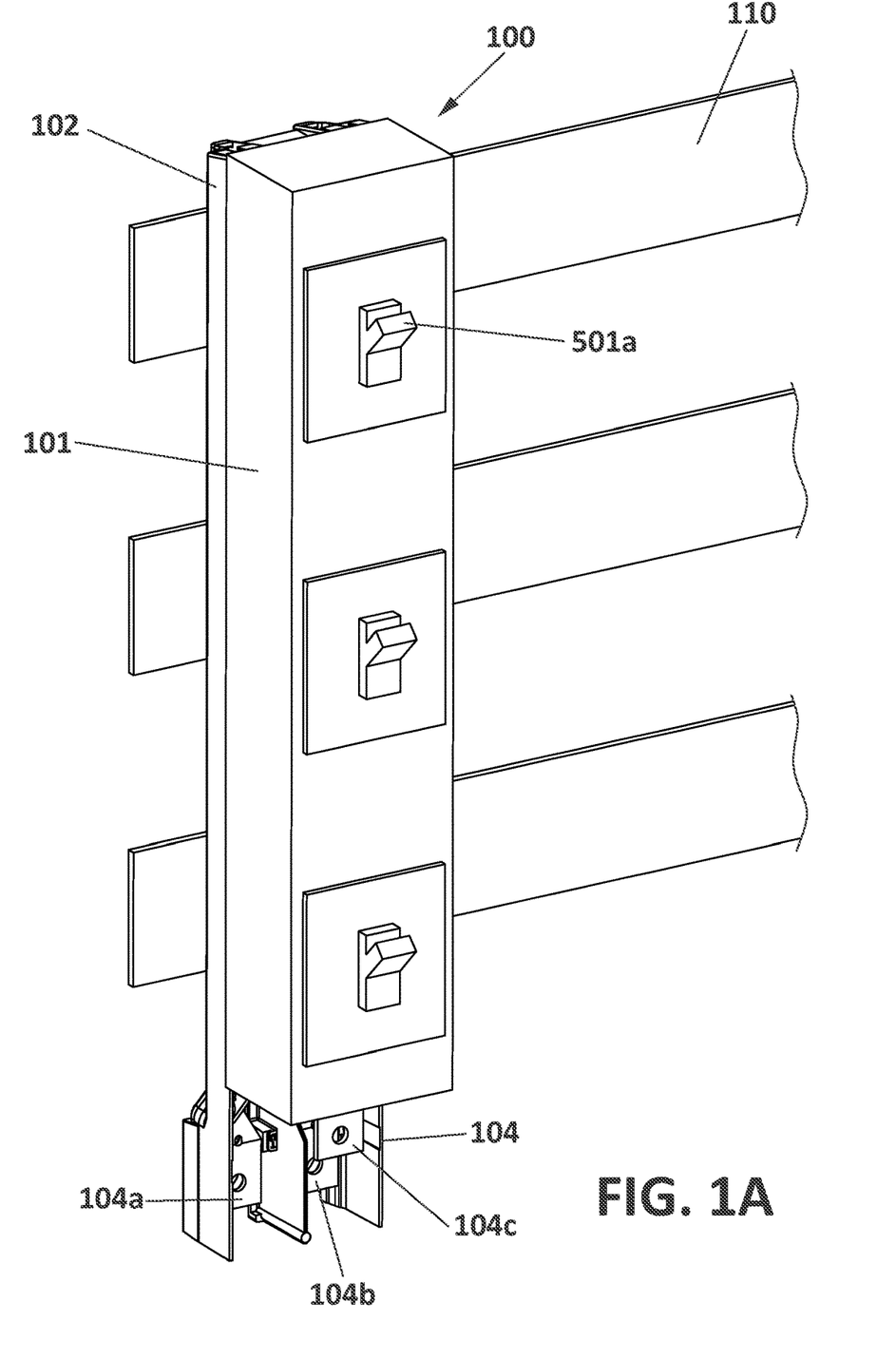
FIG. 1A shows a front view of an automatic switch for controlling and interrupting current according to the present invention connected to a busbar system.
Figures 1B, 1C:
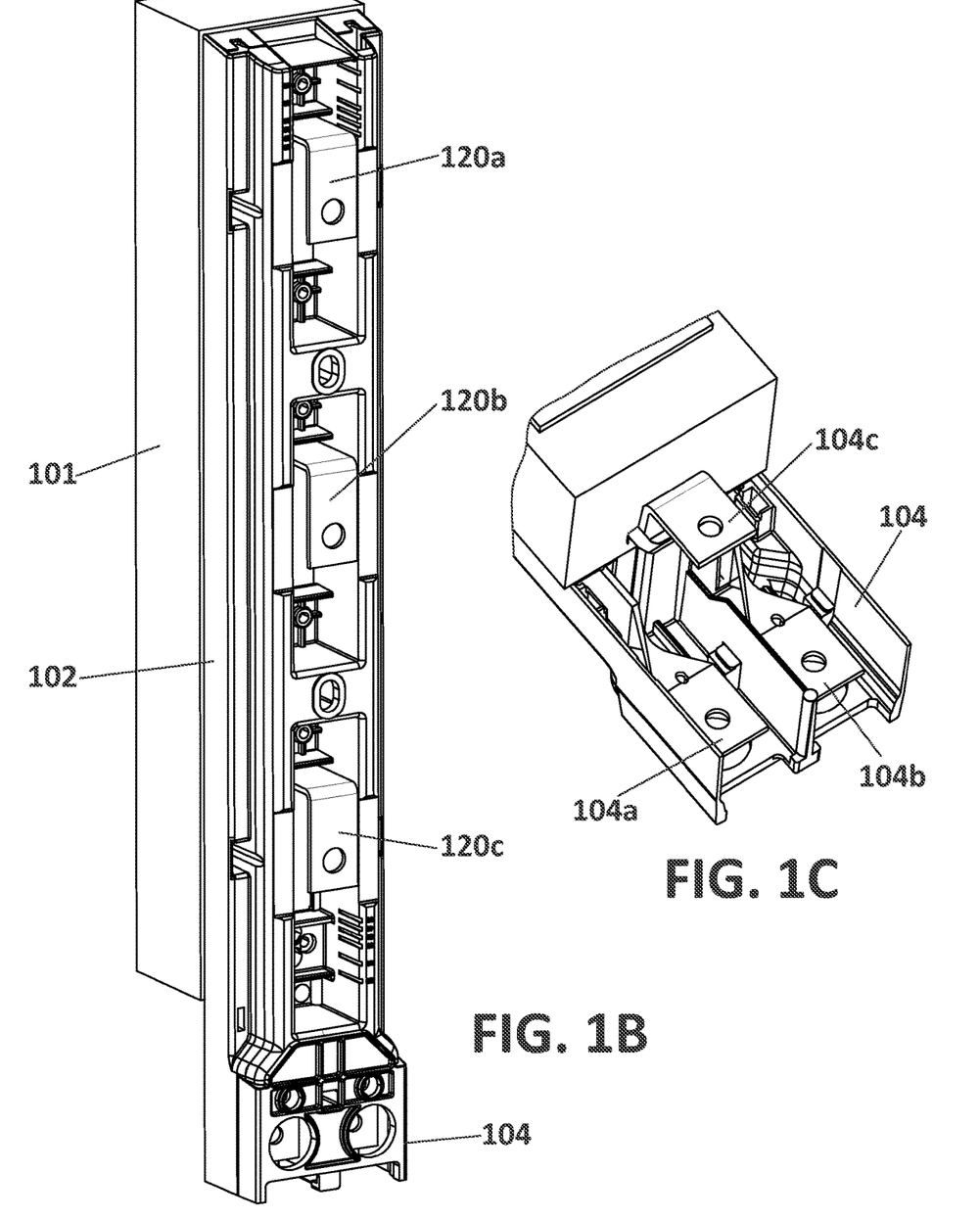
FIG. 1B shows a rear view of the automatic switch according to the present invention.
FIG. 1C shows the output connections of the automatic switch according to the present invention.

FIG. 1A shows a front view of a busbar adapter (100) with automatic switches according to the present invention connected to a three-phase busbar system (110). The busbar adapter (100) comprises a rear part or chassis (102) and a front part or protective case (101) housing single-pole modules comprising automatic interruption means for protecting against an overload and short-circuits (504) for each of the phases. Additionally, the modules may comprise for the three independent phases of a three-phase system, means for manually and/or remotely interrupting and establishing current (501a, 501b,) as can be observed in FIG. 5B, fuses (502) as can be observed in FIGS. 5B and 5C, and current sensors (503a), (503b). The busbar adapter (100) comprises a modular design formed by single-pole modules. Therefore, in the event that the switch has to be replaced due to deterioration thereof, the assembly is formed by independent one-pole elements which allow replacing the pole that is damaged and not the entire assembly.

Figure 5A:
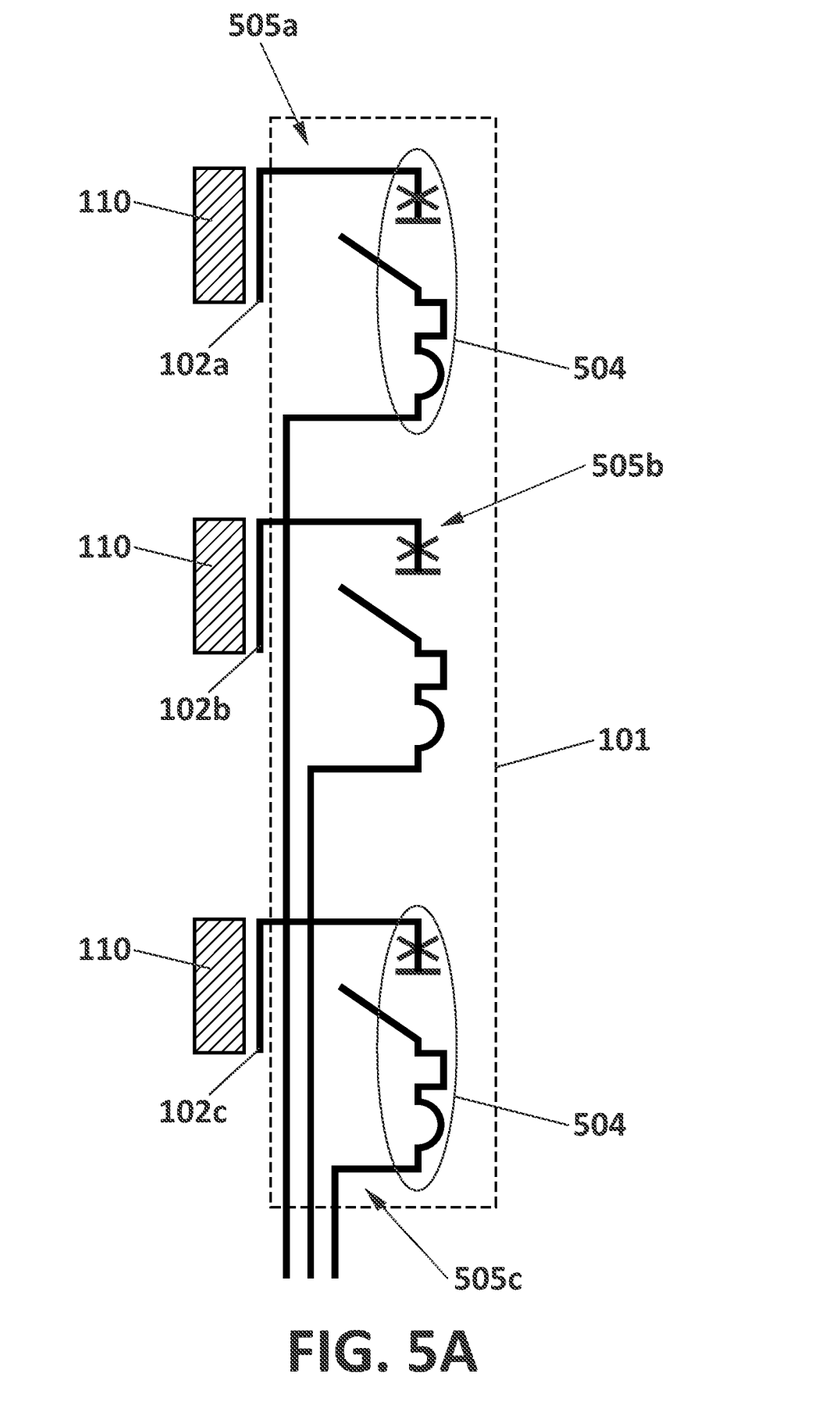
FIGS. 5A, 5B, and 5C show single-line diagrams of single-phase circuits of the automatic switch.
Figure 5B:
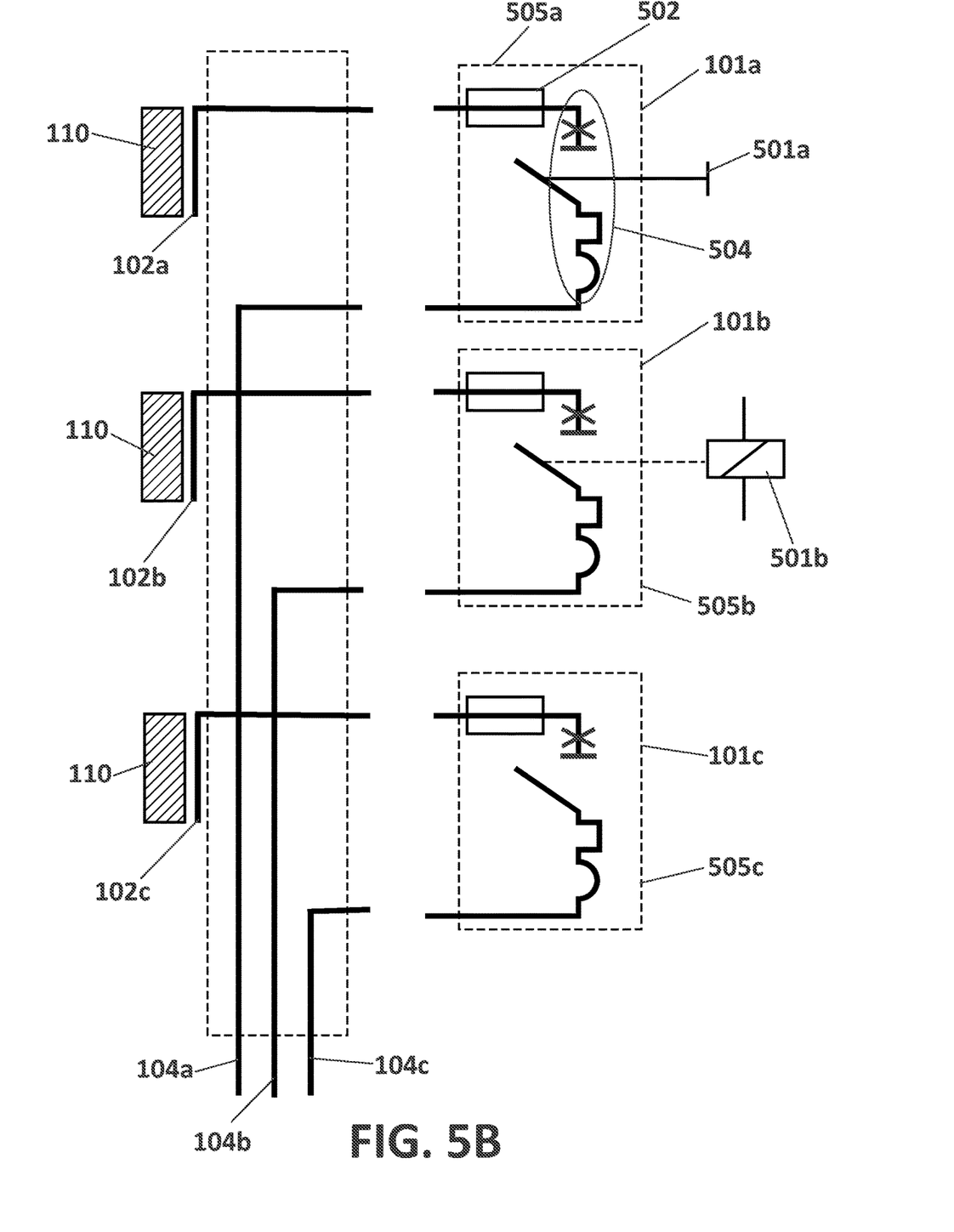
Figure 5C:
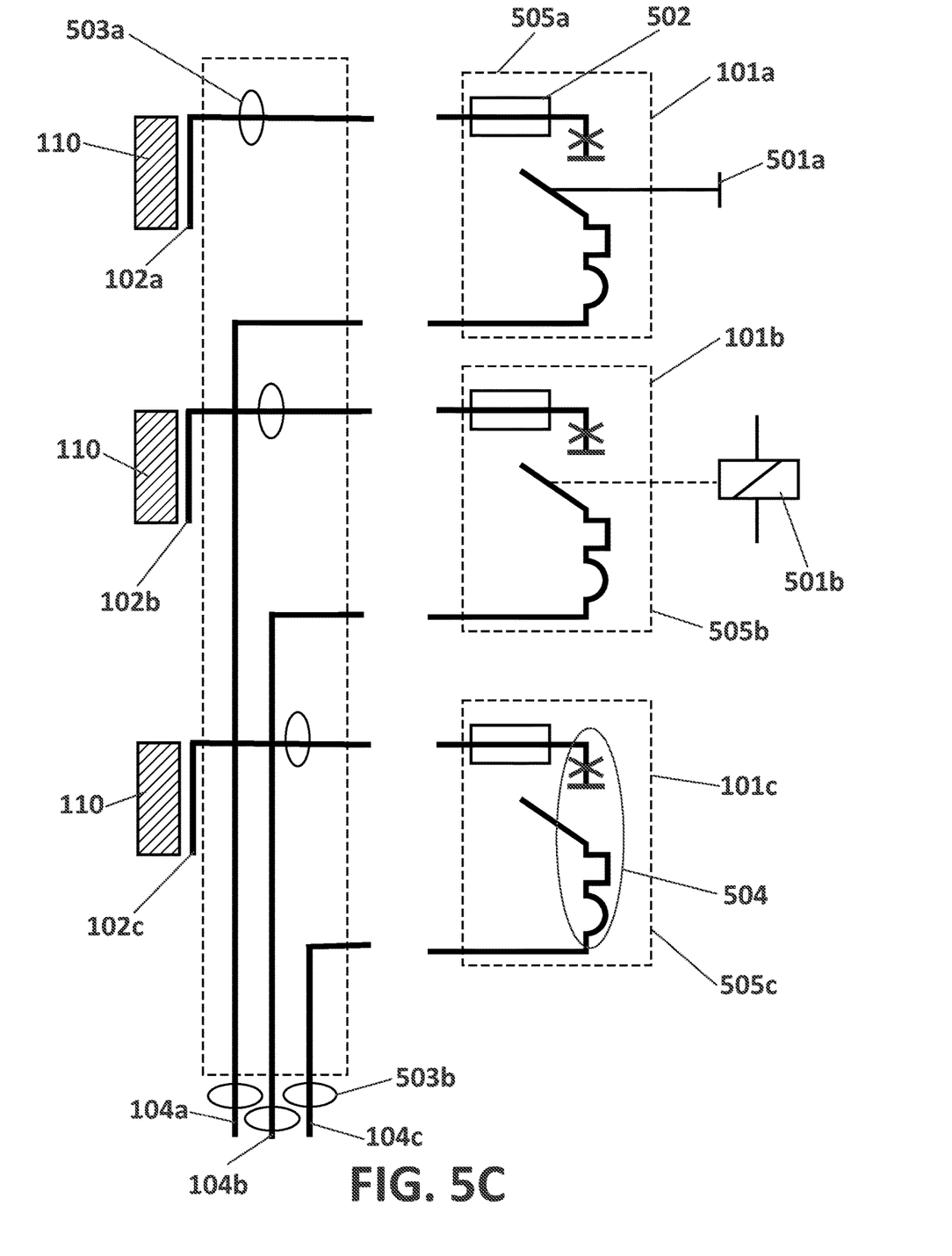

The busbar adapter (100) is designed for controlling each of the phases of the three-phase busbar (110). The chassis (102) comprises three input connections (102a, 102b, 102c) connectable to said busbar system (110) as can be observed in FIG. 1B, and an assembly of output connections (104a, 104b, 104c) as can be observed in FIG. 1C. The input connections (102a, 102b, 102c) and output connections (104a, 104b, 104c) together with the means for protecting against an overload and short-circuits (504) form three independent single-phase circuits (505a, 505b, 505c) which are shown in FIGS. 5A to 5C. In other embodiments, the number of input connections and output connections may vary.

An x-axis running parallel to the ground, from left to right in reference to the observer, and a y-axis perpendicular to the x-axis, and defining the depth of the system, are defined. Moreover, a z-axis is defined perpendicular to the other two and defines the height of the assembly. The input connections (102a, 102b, 102c) are distributed such that they form a line along the z-axis, as can be observed in FIG. 1B.

Each of the independent single-phase circuits (505a, 505b, 505c) comprises single-pole means for protecting against an overload and short-circuits (504) as shown in FIGS. 5A to 5C. Additionally, the independent single-phase circuits (505a, 505b, 505c) may comprise fuses (502) as shown in FIGS. 5B and 5C, means for manually and remotely interrupting and establishing current (501a, 501b) also shown in FIGS. 5B and 5C, and current sensors shown in FIG. 5C. The means for interrupting and establishing current (501a, 501b) can be interchangeably operated by manual operation or by remote operation, respectively, due to a short-circuit or overload or due to the express desire of the operator, and therefore allow a single-pole disconnection of the current, i.e., they allow interrupting the current of each of the phases separately.

FIG. 1B shows a rear view of the busbar adapter (100) according to the present invention. The chassis (102) and three input connections (102a, 102b, 102c) and the output connections (104a, 104b, 104c) can be seen. FIG. 1C shows the output connections (104a, 104b, 104c) of the busbar adapter (100) according to the present invention. The output connections (104a, 104b, 104c) comprise two output conductors (104a, 104b) arranged in one plane and a third output conductor (104c) arranged at a predetermined spacing from said plane, as can be seen in FIG. 1C.

Figure 2:
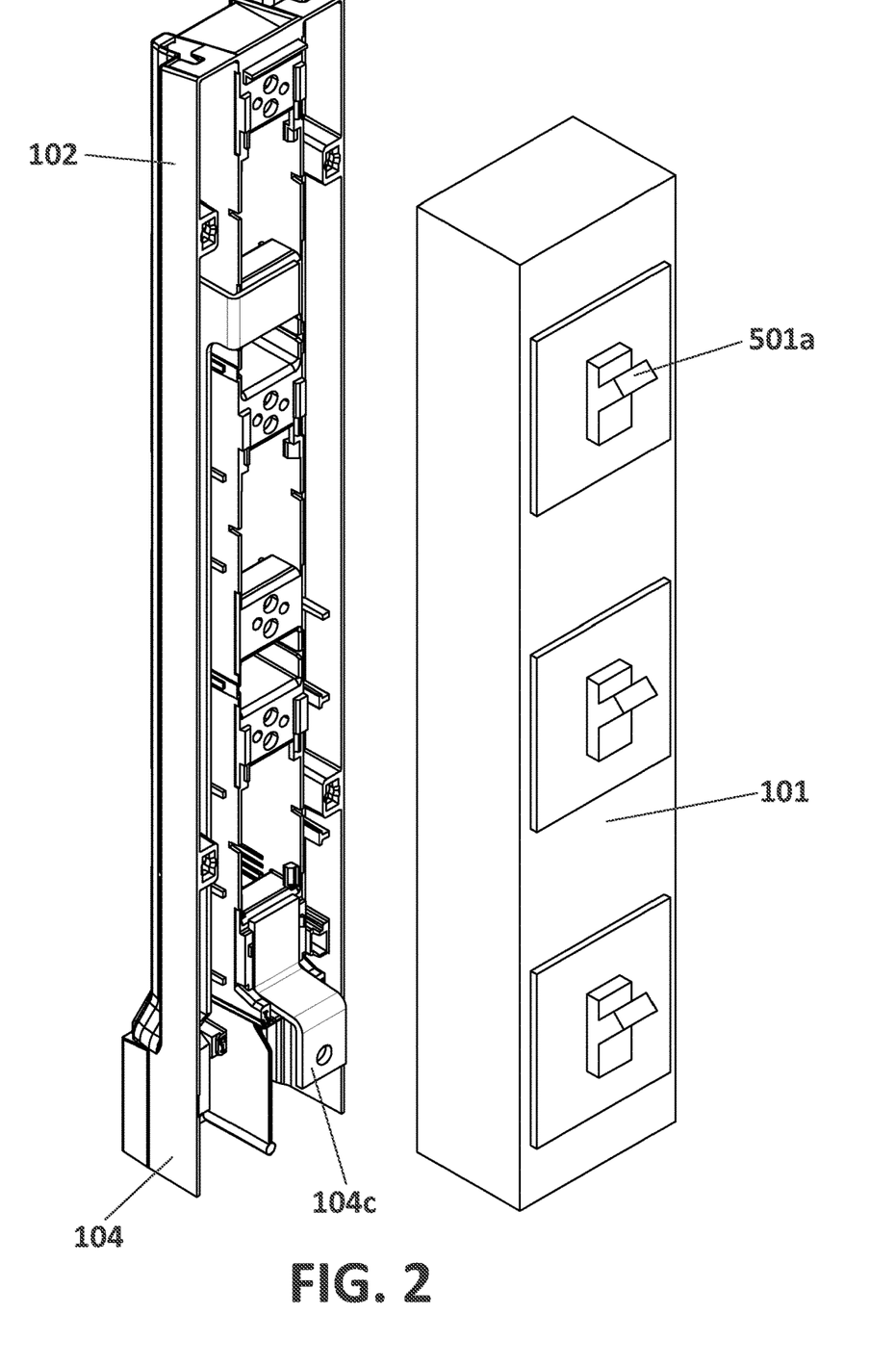
FIG. 2 shows the rear part of the automatic switch including input connections for the connection to the busbars and a front part of the automatic switch for three phases.

FIG. 2 shows the chassis (102) for the connection of the busbars to the busbar adapter (100) and for the three phases of the three-phase system. The manual actuating elements of a manual switch (501a) for interrupting and establishing current shown in FIGS. 5B and 5C can also be seen.

Figure 3A:
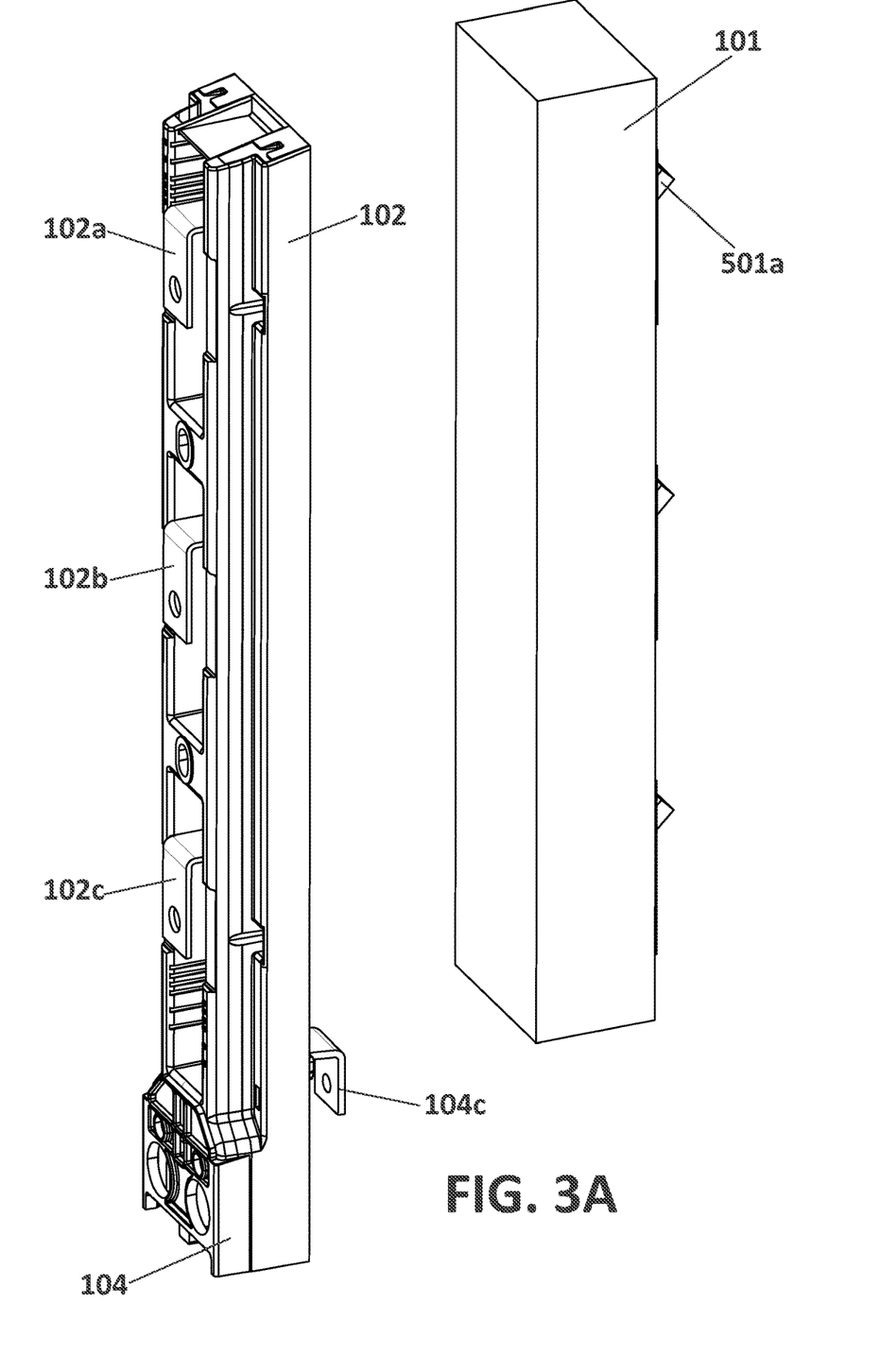
FIGS. 3A and 3B show views of the automatic switch comprising the front part separated from the rear part comprising the downward and upward output connections, respectively.
Figure 3B:
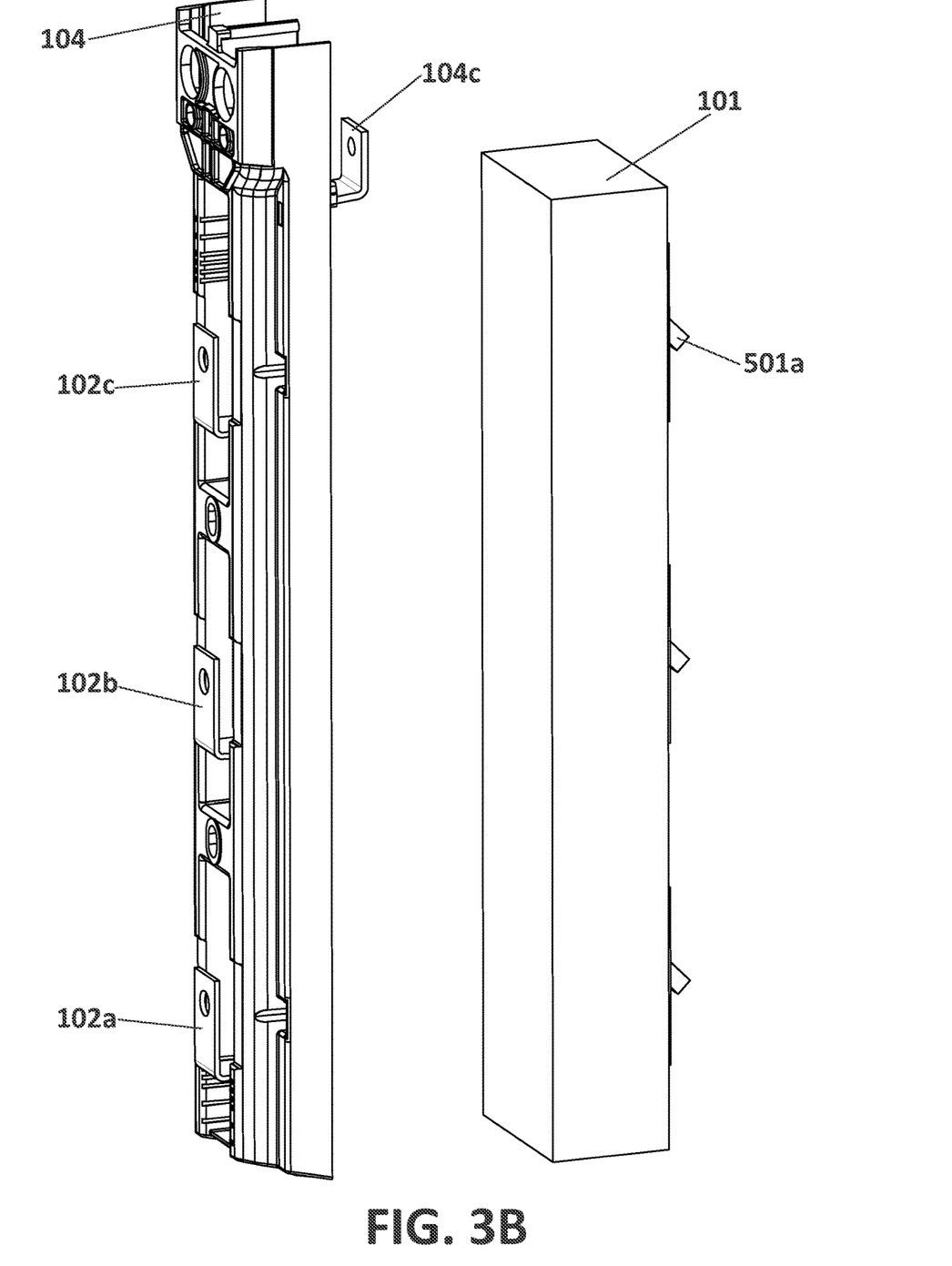

FIGS. 3A and 3B show the reversibility functionality of the busbar adapter (100) according to the present invention as a result of rotational means which allow the output connections (104a, 104b, 104c) to move 180 degrees, as can be observed in FIGS. 3A and 3B. The chassis (102) comprises output connections (104a, 104b, 104c) in a lower position with respect to the busbar (110) (FIG. 3A) and in an upper position with respect to said busbar (110) (FIG. 3B). Therefore, in FIG. 3A the output connections (104a, 104b, 104c) are located in the lower part of the chassis (102). In FIG. 3B, the output connections (104a, 104b, 104c) are located in the upper part of the chassis (102).

FIGS. 4A to 4C show the modular version of the busbar adapter (100), formed by three single-pole modules contained in the three cases or casings (101a, 101b, 101c) and the chassis (102). Each single-pole module forms an independent single-phase circuit (505a, 505b, 505), as shown in FIGS. 5A to 5C. Therefore, each module corresponds to a phase of a three-phase system of the busbar system (110). The installation of the modules on the chassis (102) of the busbar adapter (100) can be seen in FIG. 4B, completing the single-phase circuits (505*a*, 505*b*, 505) comprising the three input connections (102*a*, 102*b*, 102*c*) and the output connections (104*a*, 104*b*, 104*c*), and the elements of said modules such as the single-pole means for protecting against an overload and short-circuits (504), and additionally, switches (501*a*, 501*b*), fuses (502), and current sensors (503*a*, 503*b*).

FIGS. 5A, 5B, and 5C show three independent single-phase circuits (505*a*, 505*b*, 505) of the busbar adapter (100). FIG. 5C shows optional current sensors (503*a*) for the input connections (102*a*, 102*b*, 102*c*) and (503*b*) and current sensors (503*b*) for the output connections (104*a*, 104*b*, 104*c*), which allow monitoring the current value in said connections. The current value can be important for monitoring power and controlling same, and it will also allow, in the case of the switches (501*a*, 501*b*) being tripped, analyzing the current values prior to said tripping and being able to discern if the tripping was caused by a short-circuit or by an overload.

In FIG. 5A, the first single-phase circuit (505*a*) housed in the case (101*a*) is formed by the input connection (102*a*) and the output connection (104*a*) and means for protecting against an overload and short-circuits (504) which activate the busbar adapter (100) for a given phase, interrupting the current of said phase.

The second single-phase circuit (505*b*) comprises the input connection (102*b*), the output connection (104*b*), and means for protecting against an overload and short-circuits (504) which activate the busbar adapter (100) for a second phase, interrupting the current of said second phase. The third single-phase circuit comprises features similar to the single-phase circuits (505*a*), (505*b*) and allows interrupting the current of a third phase.

FIG. 5B shows another preferred embodiment of the single-line diagram of the three independent single-phase circuits (505*a*, 505*b*, 505) which additionally include fuses (502) and switches (501*a*, 501*b*). Therefore, the first single-phase circuit (505*a*) associated with the case (101*a*) of the busbar adapter (100) is formed by the input connection (102*a*), the output connection (104*a*), the means for protecting against an overload and short-circuits (504), a manual switch (501*a*), and a fuse (502). The manual switch (501*a*) is equipped with a control as can be seen in FIG. 1A and can interrupt or establish current in the event of a manual action by a user.

The second single-phase circuit (505*b*) comprises the input connection (102*b*), the output connection (104*b*), the means for protecting against an overload and short-circuits (504), a fuse (502), and a remote activation switch (501*b*). The remote activation switch (501*b*) of the busbar adapter (100) comprises a digital signal input which allows remote activation for controlling the current.

The third single-phase circuit (505*c*) comprises features similar to the single-phase circuits (505*a*), (505*b*) of FIG. 5B.

FIG. 5C shows another preferred embodiment of the single-line diagram of the three independent single-phase circuits (505*a*, 505*b*, 505) which additionally include fuses (502) and current sensors (503*a*) for the input connections (102*a*, 102*b*, 102*c*) and (503*b*) and/or current sensors (503*b*) for the output connections (104*a*, 104*b*, 104*c*), and which allow monitoring the value of the current in said connections. The data provided by the current sensors (503*a*), (503*b*) will be used for monitoring the operation of the adapter (100).

What is claimed is:

1. A busbar adapter comprising:
 an automatic switch, the automatic switch further comprising:
  three single-pole modules and a chassis connectable to a distribution busbar system, said chassis comprising three input connections and three of output connections,
  wherein the three input connections are arranged for their connection with a three-phase busbar distribution system such that when the device is connected to a distribution busbar system, the three input connections are located in a rear part of the device and vertically aligned with respect to the bars of the busbar distribution system,
  wherein each single-pole module comprises a first single-pole means for protection against short circuits and overloads and a second single-pole means for the manual interruption and establishment of the current or for the remote interruption and establishment of the current,
  wherein each single-pole module comprises a fuse connected in series with the first single-pole means,
  wherein the input connections and the output connections and the second single-pole means form three independent single-phase circuits respectively for each one of the three phases of the three-phase busbar distribution system,
  wherein the three output connections are arranged in a lower part of the chassis with respect to the distribution busbar system or at an upper part of the chassis with respect to the distribution busbar system, and
  further comprising current sensors arranged at the output connections or at the input connections or in the single-pole modules.

2. The busbar adapter according to claim 1, wherein the three input connections are located in a rear of the adapter in a vertical distribution.

3. The busbar adapter according to claim 1, the automatic switch further comprising mechanical means mechanically secured to the means for manually interrupting and establishing current which allow the simultaneous activation of said means in the three single-pole modules.

4. The busbar adapter according to claim 1, wherein the three single-pole modules comprise fuses.

5. The busbar adapter according to claim 4, comprising: one or more indicators of the state of the fuses; or openings for checking voltage values in posts of the fuses.

6. The busbar adapter according to claim 1, wherein the three output connections comprise two output conductors arranged in a plane and a third output conductor arranged at a predetermined spacing from said plane.

7. The busbar adapter according to claim 1, the automatic switch further comprising mechanical means for isolating the output connections.

8. The busbar adapter according to claim 1, the automatic switch further comprising openings permitting access to the input connections for tightening the input connections.

9. The busbar adapter according to claim 1, the automatic switch further comprising a rotating output connection.

10. The busbar adapter according to claim 1, the automatic switch further comprising communication means between the three single-pole modules which allow single-pole disconnection of the three modules in response to the single-pole disconnection of at least one single-pole module.

11. The busbar adapter according to claim 1, the automatic switch further comprising a removable case housing the single-pole modules.

12. The busbar adapter according to claim 11, wherein the case comprises one or more removable parts housing the single-pole modules.

13. The busbar adapter according to claim 1, further comprising electronics or software for obtaining electrical measurements associated with said adapter, for identifying a short circuit or overload and for actuating the adapter remotely and locally and in an automatically and assisted manner.

14. The busbar adapter according to claim 1, wherein the automatic switch is configured such that for connecting the input connections with the bars of a busbar system, the output connections can be rotated 180° such that the device can be installed having the output connections placed at an upper part with respect to a busbar system or placed at a lower part with respect to the busbar system.

15. The busbar adapter according to claim 1, wherein the chassis is a rear part incorporating the three input connections and the three output connections, and wherein the device further comprises a removable protective case housing the single-pole modules, wherein the protective case is couplable with the chassis.

16. The busbar adapter according to claim 1, the automatic switch further comprising electronics or software for obtaining electrical measurements associated with the device for identifying a short-circuit or overload and for actuating the device remotely and locally and in an automatic manner or in an assisted manner.

* * * * *